(12) United States Patent
Tomioka et al.

(10) Patent No.: US 9,386,246 B2
(45) Date of Patent: Jul. 5, 2016

(54) PHOTOELECTRIC CONVERSION DEVICE AND IMAGE SENSOR

(71) Applicant: Seiko Instruments Inc., Chiba (JP)

(72) Inventors: Tsutomu Tomioka, Chiba (JP); Daisuke Muraoka, Chiba (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 59 days.

(21) Appl. No.: 14/076,597

(22) Filed: Nov. 11, 2013

(65) Prior Publication Data

US 2014/0131552 A1 May 15, 2014

(30) Foreign Application Priority Data

Nov. 15, 2012 (JP) .................................. 2012-251588

(51) Int. Cl.
*H04N 5/369* (2011.01)
*H04N 5/374* (2011.01)

(52) U.S. Cl.
CPC ........... *H04N 5/3694* (2013.01); *H04N 5/3742* (2013.01)

(58) Field of Classification Search
CPC ........ G01J 1/46; H04N 5/3742; H04N 5/3694
See application file for complete search history.

(56) References Cited

U.S. PATENT DOCUMENTS

| 8,058,599 | B2 | 11/2011 | Machida et al. |
| 2004/0032628 | A1* | 2/2004 | Sato et al. ..................... 358/514 |
| 2007/0145244 | A1* | 6/2007 | Yokomichi ............... 250/214 A |

FOREIGN PATENT DOCUMENTS

JP      2006-025352 A      1/2006

* cited by examiner

*Primary Examiner* — Georgia Y Epps
*Assistant Examiner* — Don Williams
(74) *Attorney, Agent, or Firm* — Brinks Gilson & Lione

(57) ABSTRACT

To provide a small-area photoelectric conversion device without impairing a resolution switching function, signals for controlling output order control switches provided so as to correspond to photoelectric conversion elements are selected by an output order control circuit and a shift register. In this manner, the number of flip-flops forming a shift register is reduced.

5 Claims, 5 Drawing Sheets

PHOTOELECTRIC CONVERSION DEVICE AND IMAGE SENSOR

RELATED APPLICATIONS

This application claims priority under 35 U.S.C. §119 to Japanese Patent Application No. 2012-251588 filed on Nov. 15, 2012, the entire content of which is hereby incorporated by reference.

BACKGROUND OF THE INVENTION

Technical Field Text

The present invention relates to a photoelectric conversion device and an image sensor, and more particularly, to an image sensor to be applied to an image reading apparatus such as a fax machine and an image scanner.

FIG. 4 is a block diagram illustrating a conventional image sensor and a conventional photoelectric conversion device that are used in an image reading apparatus.

A conventional photoelectric conversion device 210 includes a plurality of readout circuit blocks 200, a signal processing circuit 213, and a logic circuit 222. The readout circuit blocks 200 and the signal processing circuit 213 are connected to each other by a common signal line 11. The readout circuit blocks 200 and the logic circuit 222 are connected to each other by a control signal line 223.

A conventional image sensor includes a plurality of the photoelectric conversion devices 210, which are connected to each other by signal lines $\Phi SI$, $\Phi CLK$, $\Phi MODE$, $\Phi FS$, and SIG and a readout start signal line 224.

FIG. 5 is a circuit diagram illustrating the conventional readout circuit block 200. The conventional readout circuit block 200 illustrated in FIG. 5 is configured to read out in 4-bit units.

The readout circuit block 200 includes four light receiving elements 101, 102, 103, and 104, source follower amplifiers 120, signal voltage holding capacitors 131, reference voltage holding capacitors 132, signal voltage reading switches 141, reference voltage reading switches 142, source follower amplifiers 150 for readout, signal voltage readout switches 161, reference voltage readout switches 162, readout selection switches 170, the common signal line 211, the signal processing circuit 213, four flip-flops 180 forming a shift register, three switches 112, 113, and 114 provided between the light receiving elements, and two reset switches 111 and 115 serving as reset means.

The readout circuit block 200 is configured so that the number of the light receiving elements is equal to the number of the flip-flops, and optical signals generated by all photoelectric conversion means through one scanning are output to the common signal line. Further, the signals to be input to the readout circuit block 200 (such as $\Phi C1$, $\Phi C2$, and $\Phi C3$) are generated in the logic circuit 222.

The readout circuit block 200 controls the clock signals $\Phi C1$, $\Phi C2$, and $\Phi C3$ to be supplied to the shift register to perform resolution switching (for example, see Japanese Patent Application Laid-open No. 2006-25352).

However, in such a conventional readout circuit block, the light receiving elements and the flip-flops are required in the same number, and hence the shift register occupies a large area. Therefore, there has been a problem in that the area of the photoelectric conversion device increases.

SUMMARY OF THE INVENTION

The present invention has been made to solve such a conventional problem, and can provide a small-area photoelectric conversion device by reducing the number of flip-flops forming a shift register without impairing a resolution switching function.

A photoelectric conversion device according to one embodiment of the present invention includes: a photoelectric conversion block including: a plurality of photoelectric conversion elements for outputting electrical signals in accordance with incident light; and a plurality of capacitors for storing the electrical signals of the plurality of photoelectric conversion elements; a light reception signal control switch block including a plurality of light reception signal control switches for reading out the electrical signals stored in the plurality of capacitors to a common readout line; an output order control switch block including n units including j output order control switches for controlling on and off of the plurality of light reception signal control switches, where n and j are each a natural number of 2 or more; an output order control circuit for outputting an output order control signal for sequentially turning on the j output order control switches; and a shift register for outputting, to the n units, a shift register control signal for sequentially turning on the j output order control switches.

Further, an image sensor according to one embodiment of the present invention includes a plurality of the photoelectric conversion devices, which are connected to each other.

According to the photoelectric conversion device of the present invention, there is an effect that a small-area photoelectric conversion device can be provided by reducing the number of flip-flops forming the shift register without impairing the resolution switching function.

DETAILED DESCRIPTION OF THE PREFERRED EMBODIMENTS

Figure 1:
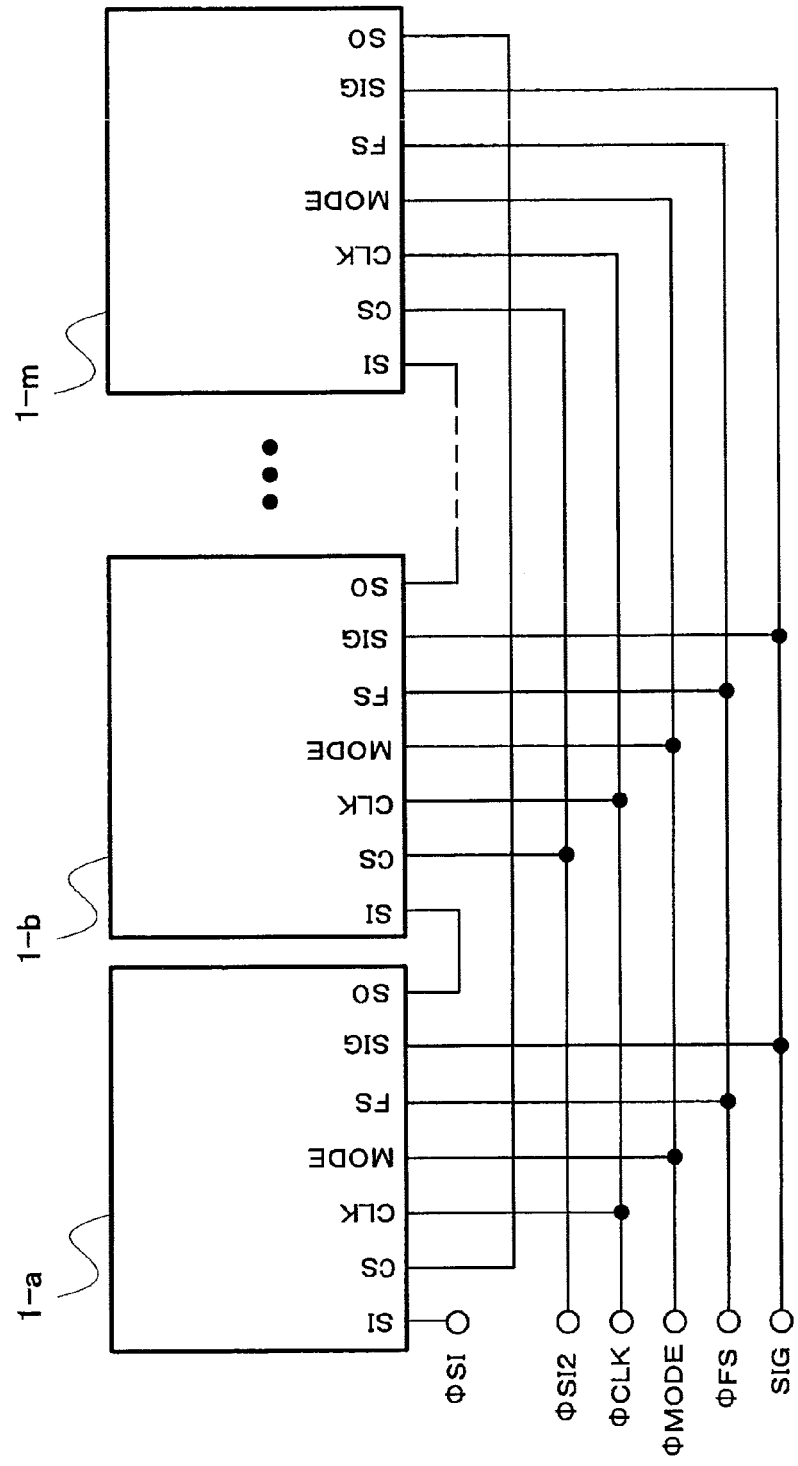
FIG. 1 is a block diagram illustrating an image sensor according to an embodiment of the present invention.

FIG. 1 is a block diagram illustrating an image sensor according to an embodiment of the present invention The image sensor of this embodiment includes a plurality of (for example, m) photoelectric conversion devices 1 that are arranged and mounted in one row. Each of the photoelectric conversion devices 1 includes an SI terminal for receiving a readout start signal $\Phi SI$, a CS terminal for receiving a chip select signal $\Phi SI2$, a CLK terminal for inputting a clock $\Phi CLK$, a MODE terminal for receiving a resolution switching signal $\Phi MODE$, an FS terminal for receiving a start pulse $\Phi FS$, an SIG terminal for outputting a light reception signal SIG, and an SO terminal for outputting a readout signal.

The readout start signal $\Phi SI$ is input to the SI terminal of a first photoelectric conversion device 1-$a$. The SI terminals of second to m-th photoelectric conversion devices 1-$b$ to 1-$m$ are each connected to the SO terminal of the preceding stage. The CS terminal of the first photoelectric conversion device 1-*a* is connected to the SO terminal of the m-th photoelectric conversion device 1-*m*. The clock ΦCLK is input to the CLK terminals in common. The resolution switching signal ΦMODE is input to the MODE terminals in common. The start pulse ΦFS is input to the FS terminals in common. The SIG terminals each output the light reception signal SIG.

Figure 2:
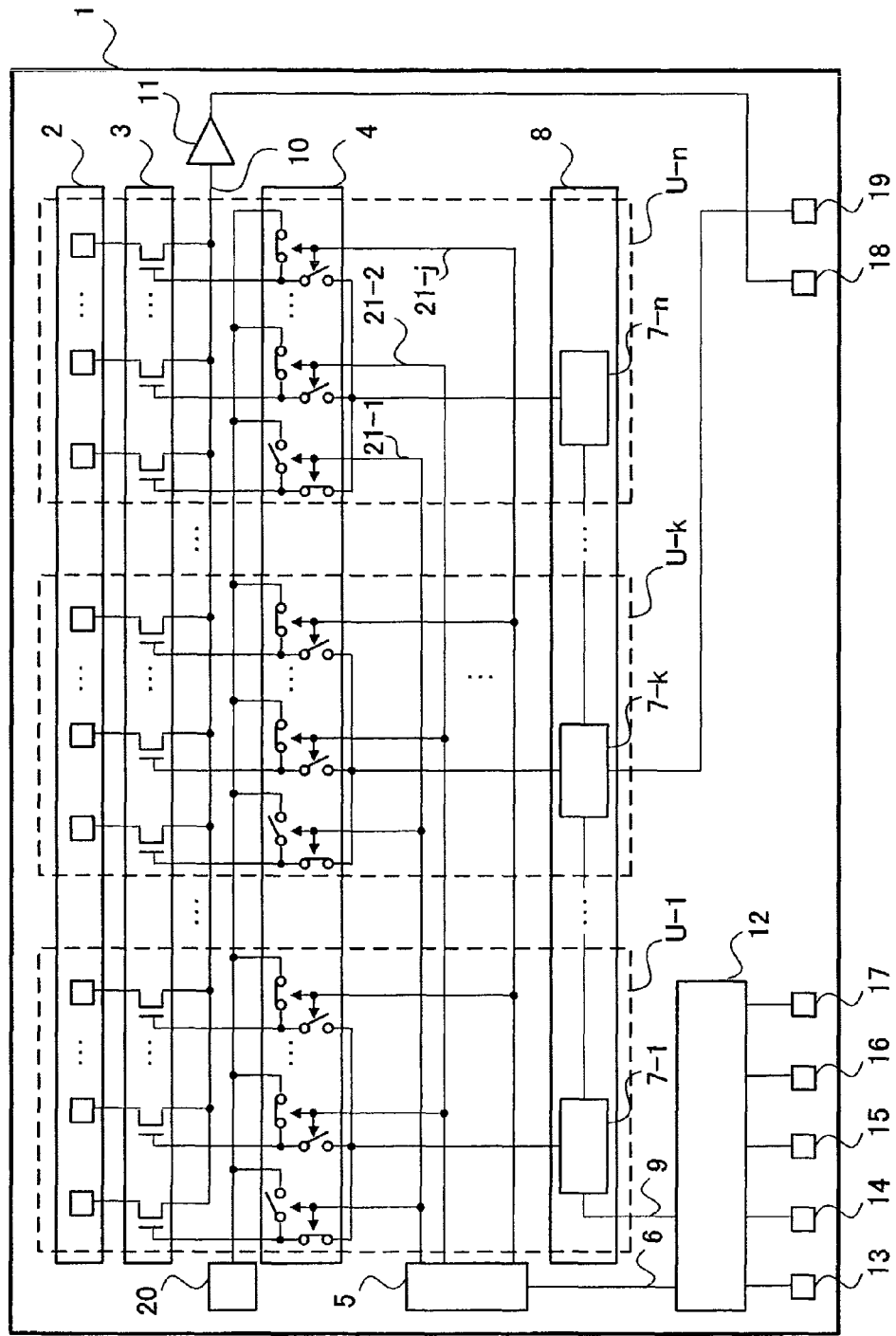
FIG. 2 is a circuit diagram illustrating a configuration of a photoelectric conversion device according to the embodiment of the present invention.

FIG. 2 is a circuit diagram illustrating the configuration of the photoelectric conversion device 1 according to this embodiment.

The photoelectric conversion device 1 includes a photoelectric conversion block 2 including a plurality of (for example, t) photoelectric conversion elements and capacitors, a light reception signal control switch block 3, an output order control switch block 4, an output order control circuit 5, a shift register 8 formed of flip-flops 7-1 to 7-*n*, a signal processing circuit 11, a logic circuit 12, a reference voltage circuit 20, an output order control signal line 6, a shift register control signal line 9, a common signal line 10, output order control lines 21-1 to 21-*j*, an SI terminal 13, a CS terminal 14, a CLK terminal 15, a MODE terminal 16, an FS terminal 17, an SIG terminal 18, and an SO terminal 19. The respective circuit elements of the photoelectric conversion device 1 form n photoelectric conversion units U-1 to U-n each including j photoelectric conversion elements and respective circuit elements corresponding thereto as one group.

The photoelectric conversion block 2 is connected to the common signal line 10 via the light reception signal control switch block 3. The common signal line 10 is connected to the SIG terminal 18 via the signal processing circuit 11. The SI terminal 13, the CS terminal 14, the CLK terminal 15, the MODE terminal 16, and the FS terminal 17 are connected to the logic circuit 12. The logic circuit 12 is connected to the output order control circuit 5 by the output order control signal line 6, and is connected to the shift register 8 by the shift register control signal line 9. The output order control switch block 4 is connected to the control lines of the output order control circuit 5, the shift register 8, and the reference voltage circuit 20 to control the light reception signal control switch block 3 by the respective control lines. Although not illustrated, the common signal line 10 may be connected to a constant current source.

In the photoelectric conversion block 2, the photoelectric conversion element converts incident light into an electrical signal (light reception signal SIG), and stores the light reception signal SIG in the capacitor. The light reception signal SIG stored in the capacitor is sequentially read out to the common signal line 10 via the light reception signal control switch block 3. Then, the light reception signal SIG is output to the SIG terminal 18 via the signal processing circuit 11. The output order control switch block 4 selects the photoelectric conversion element from which the signal is read out in the photoelectric conversion unit U. The output order control circuit 5 outputs an output order control signal for controlling the output order control switch block 4 via the output order control lines 21-1 to 21-*j*. The reference voltage circuit 20 supplies a reference voltage to the output order control switch block 4. The logic circuit 12 generates, based on respective signals input to the SI terminal 13, the CS terminal 14, the CLK terminal 15, the MODE terminal 16, and the FS terminal 17, a shift register control signal for controlling the shift register 8 and the output order control signal for controlling the output order control circuit 5. The shift register 8 sequentially transfers the shift register control signal from the flip-flop 7-1 in the initial stage to the flip-flop 7-*n* in the final stage, and further outputs the shift register control signal to the output order control switch block 4. The k-th flip-flop 7-*k* has an output connected to the SO terminal 19.

Figure 3:
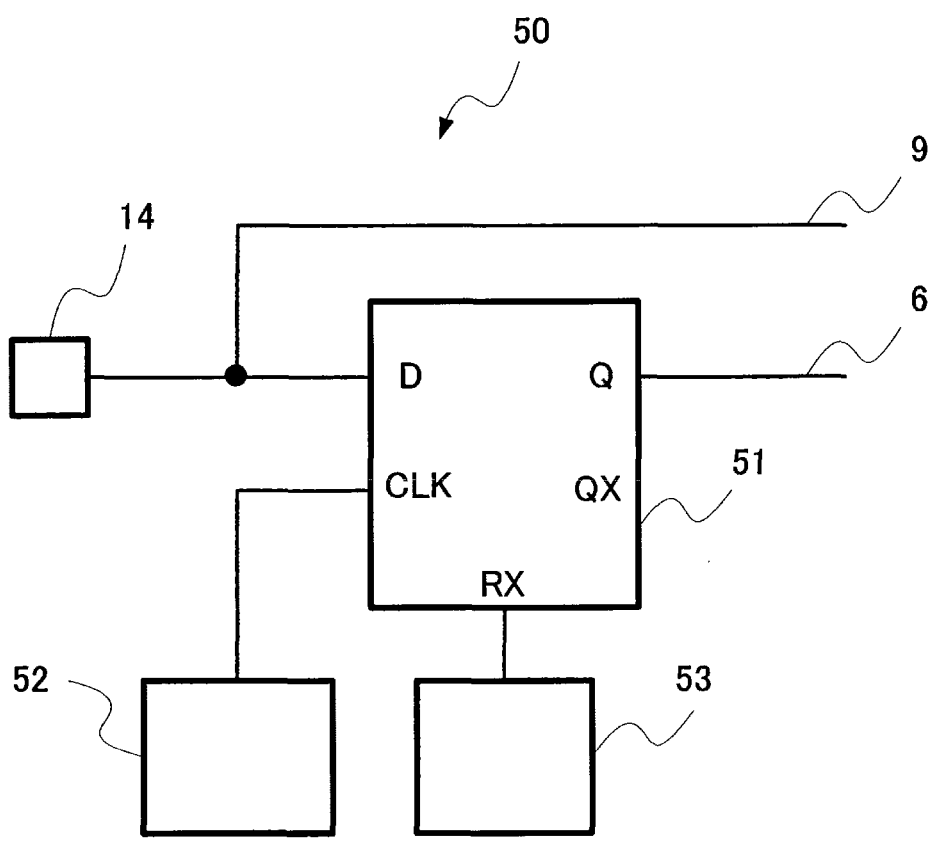
FIG. 3 is a block diagram illustrating a configuration of a holding circuit.
Figure 4:
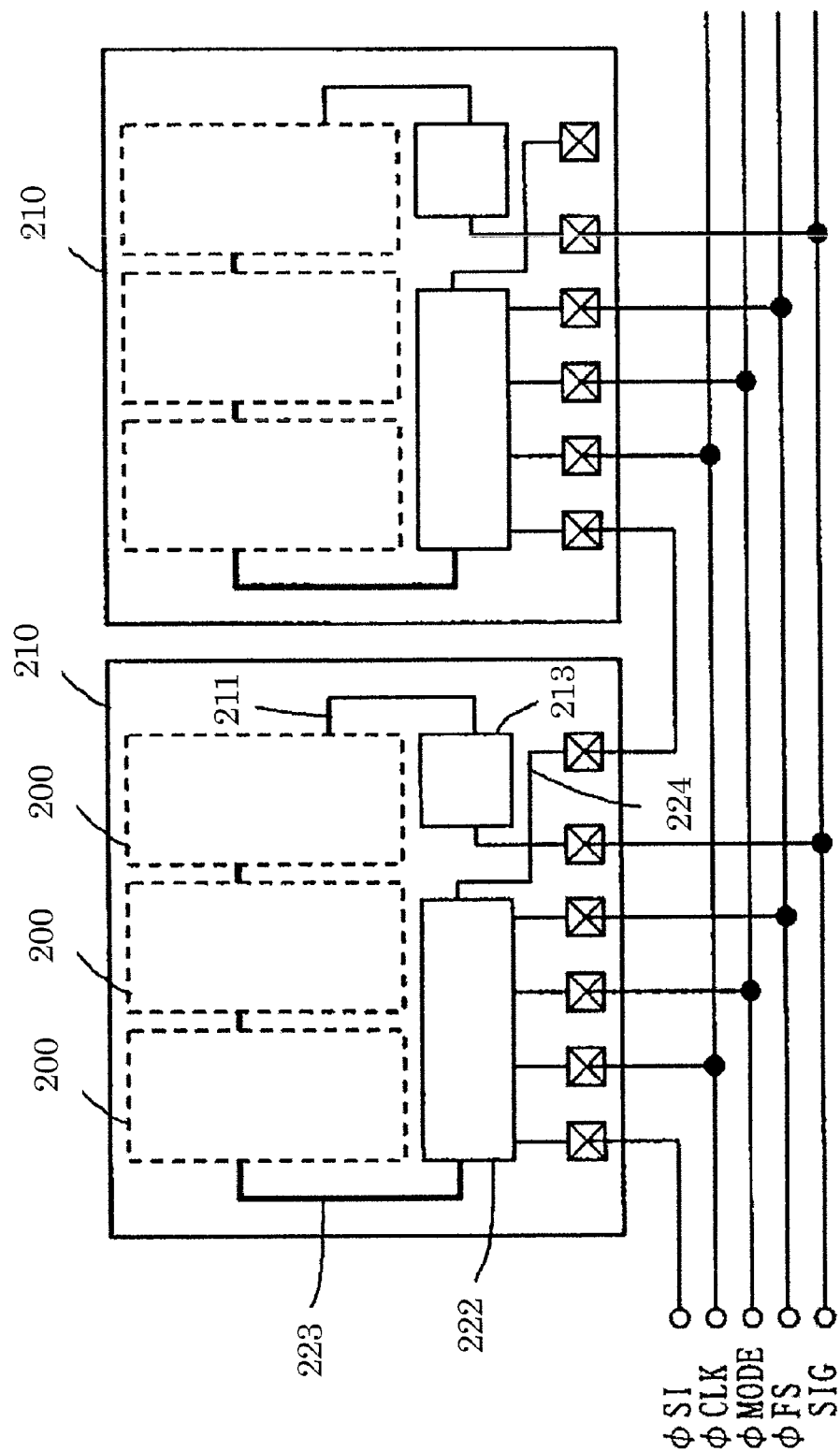
FIG. 4 is a block diagram illustrating a conventional image sensor and a conventional photoelectric conversion device.
Figure 5:
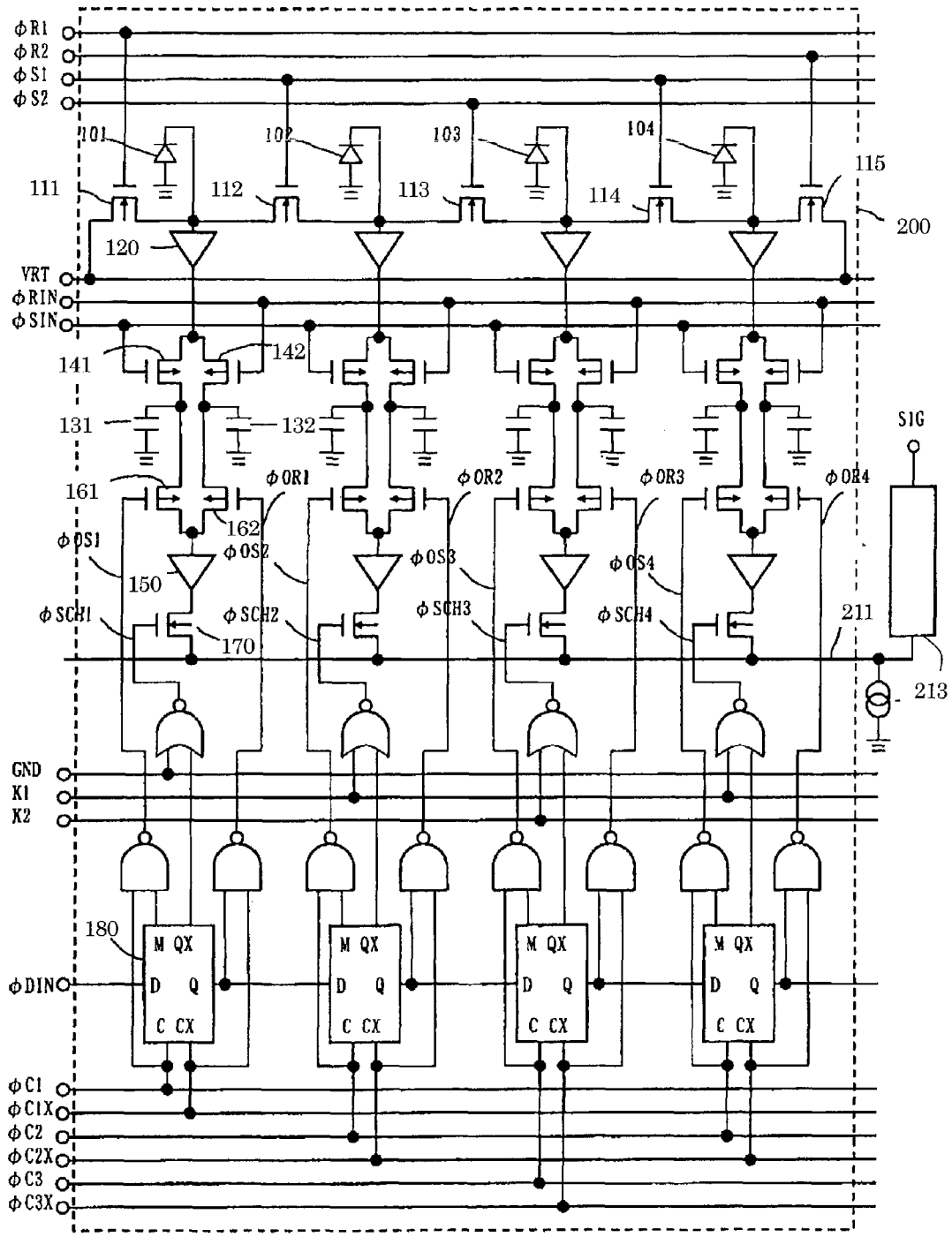
FIG. 5 is a circuit diagram illustrating a readout circuit block of a conventional image reading apparatus.

The logic circuit 12 includes therein a holding circuit 50 for holding a signal input to the CS terminal 14 at the time of start of readout. FIG. 3 is a block diagram illustrating the configuration of the holding circuit 50.

The holding circuit 50 of FIG. 3 includes a flip-flop 51, a single-pulse generating circuit 52, and a reset control circuit 53. The flip-flop 51 has a terminal D connected to the CS terminal 14, a terminal CLK connected to the single-pulse generating circuit 52, a terminal RX connected to the reset control circuit 53, and a terminal Q connected to the output order control circuit 5 via the output order control signal line 6. The single-pulse generating circuit 52 generates a pulse when the start pulse ΦFS is input. Therefore, the flip-flop 51 holds a signal input to the terminal D, that is, the CS terminal 14 at this time, and outputs the signal to the terminal Q. The logic circuit 12 determines, based on the data of the terminal Q of the flip-flop 51, whether the photoelectric conversion device is the first photoelectric conversion device 1 or the photoelectric conversion device 1 in the second or subsequent stage. In this case, the CS terminal 14 of the photoelectric conversion device 1-*a* is connected to the SO terminal 19 (for example, Lo level) of the photoelectric conversion device 1-*m*, and the chip select signal ΦSI2 (for example, Hi level) is input to the CS terminals 14 of the photoelectric conversion devices 1-*b* to 1-*m*. Therefore, the data of the terminal Q of the flip-flop 51 of the first photoelectric conversion device 1-*a* is Lo level, and the data of the terminals Q of the flip-flops 51 of the photoelectric conversion devices 1-*b* to 1-*m* are Hi level. As described above, whether each of the photoelectric conversion devices 1-*a* to 1-*m* is the first photoelectric conversion device or not is determined.

The photoelectric conversion device 1 is configured so that a plurality of resolutions can be obtained depending on the data of the resolution switching signal ΦMODE. The output order control circuit 5 controls on and off of output order control switches of the output order control switch block 4 via the output order control lines 21-1 to 21-*j* to switch the resolution. For example, when two adjacent output order control switches of the output order control switch block 4 are simultaneously turned on or off, the resolution becomes 1/2.

In this case, the output order control switches of the output order control switch block 4 are provided in the number corresponding to the number of the photoelectric conversion elements, and the same number of flip-flops 7 are necessary in the shift register 8 for outputting signals for controlling those output order control switches. However, according to the photoelectric conversion device 1 of this embodiment configured to select the output order control switches by the output order control circuit 5 and the shift register 8, when the number of the output order control lines 21 is j, the number of the flip-flops 7 may be 1/j.

Next, a signal readout operation of the image sensor of this embodiment is described.

In response to input of the readout start signal ΦSI to the SI terminal 13 of the first photoelectric conversion device 1-*a* after the photoelectric conversion elements of the photoelectric conversion block 2 store an optical signal for a predetermined time period, the image sensor starts the readout operation.

In response to the input of the readout start signal ΦSI, the logic circuit 12 generates the output order control signal and the shift register control signal. In response to the input of the output order control signal, the output order control circuit 5 controls the output order control switches connected to the output order control line 21-1 so as to establish a conduction state between the output signal of the shift register 8 and a switch control section for the switch of the light reception signal control switch block 3. Further, the output order control circuit 5 controls the output order control switches connected to the output order control lines 21-2 to 21-j so that the switch control sections for the switches of the light reception signal control switch block 3 become the reference voltage.

In response to the input of the shift register control signal, the shift register 8 outputs a signal for the flip-flop 7-1 corresponding to the photoelectric conversion unit U-1 to turn on the switches of the light reception signal control switch block 3, and outputs signals for the other flip-flops 7-2 to 7-n to turn off the switches of the light reception signal control switch block 3. Therefore, the first photoelectric conversion element of the photoelectric conversion unit U-1 is connected to the common signal line 10 to output the light reception signal SIG to the SIG terminal 18 via the signal processing circuit 11.

Under this state, the output order control circuit 5 sequentially outputs the control signals to the output order control lines 21-2 to 21-j so as to turn on the output order control switches. As described above, the light reception signals SIG of the second to j-th photoelectric conversion elements of the photoelectric conversion unit U-1 are sequentially output.

The shift register 8 outputs signals for the flip-flop 7-2 to the flip-flop 7-n to turn on the switches of the light reception signal control switch block 3. Then, after the light reception signal SIG of the final photoelectric conversion element of the final photoelectric conversion unit U-n is output, the readout of the signals of the first photoelectric conversion device 1 is completed.

In this case, the signal of the flip-flop 7-k is output to the SO terminal 19 to be input to the SI terminal 13 of the second photoelectric conversion device 1. That is, based on the signal of the flip-flop 7-k, preparation of the readout operation of the next photoelectric conversion device 1 is started. At this time, k may be appropriately determined in accordance with a delay time period for starting the readout operation after the photoelectric conversion device 1 inputs the signal to the SI terminal 13. By configuring the photoelectric conversion device 1 as described above, the readout operation at the time of switch of the photoelectric conversion device 1 can be seamlessly executed.

As described above, the readout operation is sequentially performed from the first photoelectric conversion device 1-a to the final photoelectric conversion device 1-m.

In this case, the CS terminal 14 of the photoelectric conversion device 1-a is connected to the SO terminal 19 of the photoelectric conversion device 1-m to input the signal of the flip-flop 7-k of the photoelectric conversion device 1-m. The photoelectric conversion device 1-a is designated as the first photoelectric conversion device, and hence the logic circuit 12 is set so that the signal input to the CS terminal 14 acts similarly to the readout start signal ΦSI. That is, the photoelectric conversion device 1-a receives the signal of the SO terminal 19 of the photoelectric conversion device 1-m to start the preparation of the readout operation.

As described above, in the image sensor of the present invention, the number of the flip-flops 7 forming the shift register 8 can be reduced to 1/j, and hence the chip area can be reduced. Further, as compared to the conventional image sensor, a switch is unnecessary for the readout path of the light reception signal SIG, and hence there is achieved such an effect that no noise increase is caused due to the on-resistance of the switch.

Note that, the photoelectric conversion block 2 may include two capacitors with respect to a photoelectric conversion element so as to store an optical signal and a reference charge and output a difference therebetween. Even with this configuration, similar effects can be obtained.

What is claimed is:

1. A photoelectric conversion device, comprising:
a photoelectric conversion block including:
a plurality of photoelectric conversion elements for outputting electrical signals in accordance with incident light; and
a plurality of capacitors for storing the electrical signals of the plurality of photoelectric conversion elements;
a light reception signal control switch block including a plurality of light reception signal control switches for reading out the electrical signals stored in the plurality of capacitors to a common readout line;
an output order control switch block including n units including j output order control switches for controlling an on and off state of the plurality of light reception signal control switches, where n and j are each a natural number of 2 or more;
an output order control circuit for outputting an output order control signal for sequentially turning on the j output order control switches; and
a shift register comprising n flip-flops circuits for outputting, to the n units, a shift register control signal for sequentially turning on the j output order control switches, where the number n of the flip-flop circuits is less than the number j of the output order control switch units.

2. A photoelectric conversion device according to claim 1, wherein the n flip-flops sequentially output the shift register control signal.

3. A photoelectric conversion device according to claim 2, further comprising:
an output terminal for outputting the shift register control signal of a k-th flip-flop, where $1 \leq k \leq n$;
an input terminal connected to the output terminal; and
a logic circuit for generating the output order control signal and the shift register control signal based on the shift register control signal input to the input terminal.

4. A photoelectric conversion device according to claim 3, further comprising a second input terminal for inputting a chip select signal, wherein the logic circuit has a function of detecting whether the photoelectric conversion device is a first photoelectric conversion device or a second or subsequent photoelectric conversion device based on the chip select signal.

5. An image sensor, comprising a plurality of the photoelectric conversion devices according to claim 1, which are connected to each other.

* * * * *